United States Patent [19]

Hernandez Garcia

[11] 3,892,507
[45] July 1, 1975

[54] METHOD AND MEANS FOR MOLDING A FASTENER ONTO A PIECE OF FABRIC

[75] Inventor: Maria Cruz Hernandez Garcia, Madrid, Spain

[73] Assignee: Cinva S.A., Madrid, Spain

[22] Filed: Feb. 20, 1973

[21] Appl. No.: 333,504

Related U.S. Application Data

[63] Continuation-in-part of Ser. No. 183,480, Sept. 14, 1971, abandoned.

[30] Foreign Application Priority Data
Dec. 28, 1970  Spain .................... 161985

[52] U.S. Cl. ................. 425/129; 425/814
[51] Int. Cl. .......................... B29d 31/00
[58] Field of Search .......... 425/129, DIG. 814, 117, 425/250, 242, DIG. 34; 249/88, 95, 91, 96, 97; 264/273, 275, 279

[56] References Cited
UNITED STATES PATENTS

| | | | |
|---|---|---|---|
| 2,735,139 | 2/1956 | Morin | 264/273 X |
| 3,097,395 | 7/1963 | Yoshida | 425/129 X |
| 3,463,849 | 8/1969 | Winkler | 425/129 X |
| 3,551,956 | 1/1971 | Rosier | 249/95 X |

Primary Examiner—Francis S. Husar
Assistant Examiner—Carl Rowold
Attorney, Agent, or Firm—Wenderoth, Lind & Ponack

[57] ABSTRACT

A portion of a piece of fabric is positioned within the cavity of a mold shaped to form the desired fastener. The fabric within the cavity is spaced from opposite walls thereof. Molten material to form the fastener is injected into the cavity through a single nozzle at an angle to an edge of the cavity and in a plane corresponding to the plane of the fabric within the cavity.

2 Claims, 22 Drawing Figures

METHOD AND MEANS FOR MOLDING A FASTENER ONTO A PIECE OF FABRIC

This application is a continuation-in-part of copending application Ser. No. 183,480, filed Sept. 24, 1971, now abandoned.

BACKGROUND OF THE INVENTION

The present invention relates to improved methods and means for producing plastic fasteners rigidly secured to a fabric, such as canvas. More particularly, the present invention relates to such methods and means wherein the plastic fastener is molded onto the fabric. Such fasteners may be belting buckles, grommets, rings etc.

In the past, such fasteners have been attached to awnings, tents, belts, etc., by means of sewing or rivetting. However, such fastening methods have certain inherent disadvantages. Particularly, under relatively high or merely continuous mechanical stress, the connections fail within a very short time.

To overcome the problems involved with fastening by sewing or rivetting, prior attempts have been made to inject the plastic material which is to form the fastener onto the fabric. These attempts have the common feature that the fabric piece, onto which the fastener is to be applied, is partially introduced into the mold for forming the fastener.

To date, however, such prior attempts have not been totally satisfactory since they inherently involve certain disadvantages.

In such known systems, for example for molding a fastener to the end of a fabric tape or belt, it has not been possible to adequately position the tape in the interior of the mold in order to keep it centered with regards the cavities of the mold and countermold and thus to achieve an equal thickness of plastic material on both surfaces of the tape.

Furthermore, in known systems, the plastic is usually injected from a plane orientated towards one of the surfaces of the portion of the fabric introduced into the mold, and consequently the injection pressure twists the fabric within the interior of the mold. Thus, the fabric can become pushed against one of the molding cavity walls and consequently such portion of the fabric would not be covered by plastic.

Also, in order that the plastic injection may cover both surfaces of the portion of fabric introduced into the mold, such fabric is punched with holes which allow passage of the plastic from one of the surfaces of the fabric towards the other surface thereof. This punching of the fabric in the area of which the molded plastic is attached will of course weaken the fabric. While this weakening may be satisfactory for some products, it of necessity is undesirable for certain products where fabric strength is critical.

Furthermore, the plastic pieces are normally molded onto a fabric tape or band through various injection points. This presents the problem that the mechanical strength of the molded plastic piece is poor. This is due to the fact that the temperature of the injected plastic is lower at its advancing edges than in the mass thereof, and since various injection points exist, numerous advance lines or edges are formed. These edges, when joined at a lower temperature than that of the injected mass, produce welding lines which are weak points within the injected fastener.

OBJECTS OF THE INVENTION

It is a primary object of the present invention to provide a method and means for molding devices onto fabric, while avoiding the above discussed disadvantages of prior art systems.

A further object of the present invention is to provide a method and means for keeping the fabric separated from the walls of the cavity in the mold and countermold.

Another object of the present invention is to provide a method and means for directing the injection flow in a direction from the closure line of the mold and countermold, onto the fabric, thus obtaining an effect which may be defined as "combing" of the fabric.

Another object of the invention is to provide a method and means for centering, for example textile bands or tapes which normally do not have accurate widths, within the mold.

A still further object of the present invention is to provide a method and means for maintaining the fabric along the joining line of the mold and countermold when they are closed on the fabric, in order to obtain perfect alignment of the fabric. Such means further helps to strip the mold from the injected piece when the mold plates are divergingly separated.

Another important object of the present invention is the provision of a system wherein the plastic injection will preferentially take place through a single point which will be orientated obliquely towards the edge of the cavity through which the fabric extends into the cavity, and such single point will be situated in the plane defined by the portion of the plane of the fabric introduced into the mold.

Other objects and features of the invention will become apparent from the following description, taken with the accompanying drawings.

DETAILED DESCRIPTION OF THE INVENTION

Figure 1A:
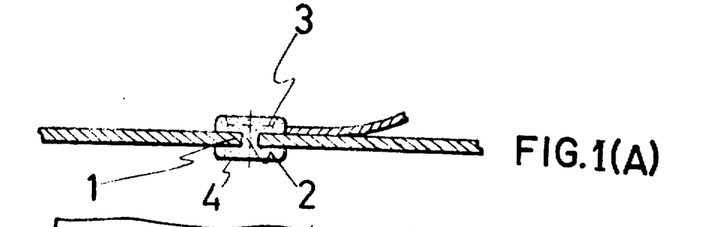
FIGS. 1A and 1B are respectively a cross-section along line IA—IA of FIG. 1B and a plan view of a first type of fabric fastener combination made in accordance with the present invention.
Figure 1B:
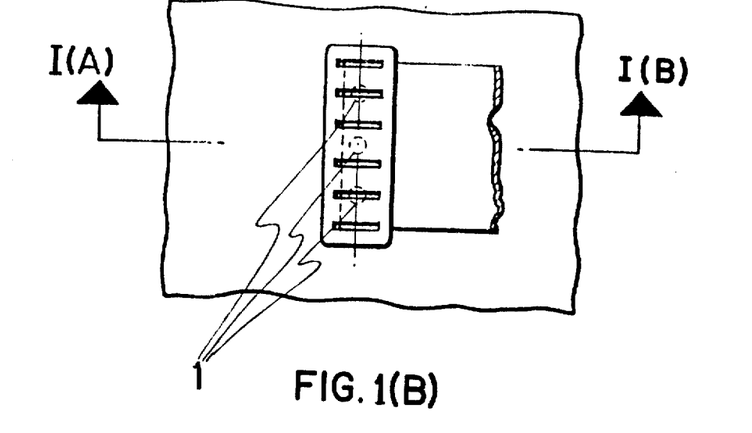

In FIGS. 1A and 1B there is shown a flexible tape or belt attached to the center portion of a piece of fabric by means of the system of the present invention. In carrying out this embodiment, it is necessary that holes 1 be provided through the piece of fabric. During the molding process wherein the plastic fastener is formed, a portion of the plastic material 2 will fill the holes 1, thereby uniting the portions 3 and 4 on opposite sides of the fabric.

Figure 2A:
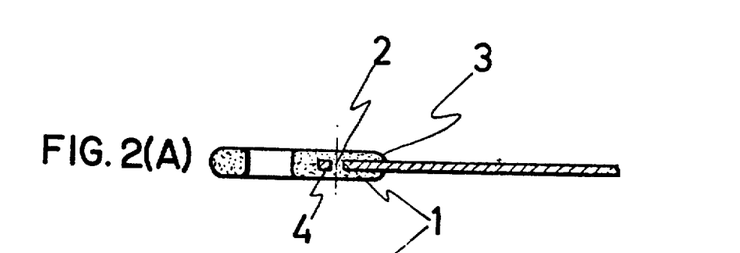
FIGS. 2A and 2B are respectively a cross-section along line IIA—IIA of FIG. 2B and a plan view of a second type of fabric fastener combination made in accordance with the present invention.
Figure 2B:
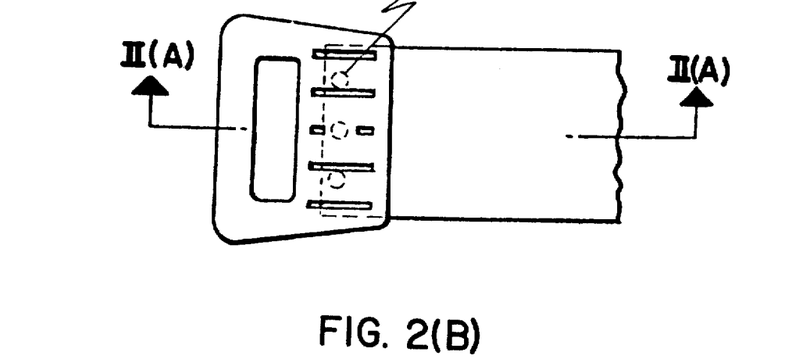

In FIGS. 2A and 2B there is shown a fastener attached to the end of a fabric belt or strip. As shown, holes 1 may be provided through the end of the fabric if desired. However, it is not necessary for these holes to be provided to carry out the concept of the present invention.

Figures 3A, 3B, 3C, 3D:
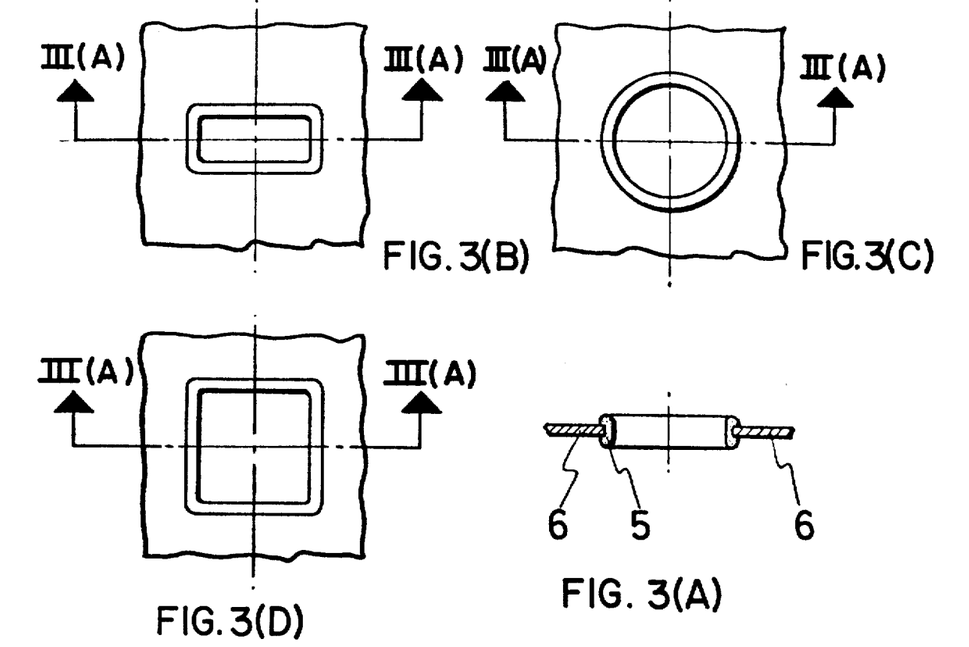
FIGS. 3A and 3B—3D are respectively a cross-section along line IIIA—IIIA of FIG. 3B—3D and plan views of variations of a third type of fabric fastener combination made in accordance with the present invention.
Figure 4A:
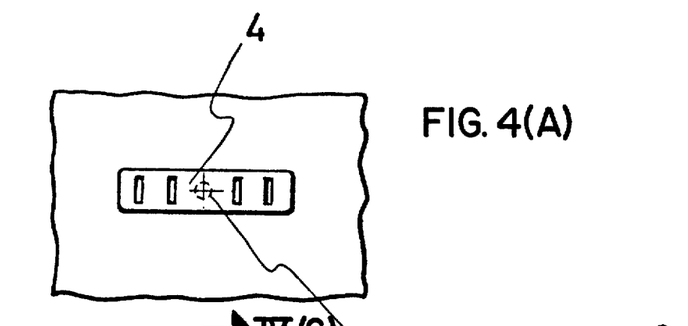
FIGS. 4A—4C are respectively a bottom view, a side view partically in cross-section, and a cross-section along line IVC—IVC of FIG. 4B of a fourth type of fabric fastener combination made in accordance with the present invention.
Figure 4B:
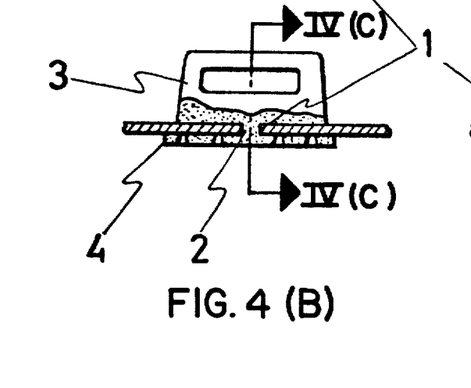
Figure 4C:
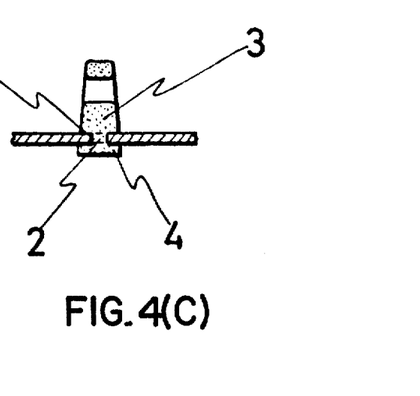
Figure 5A:
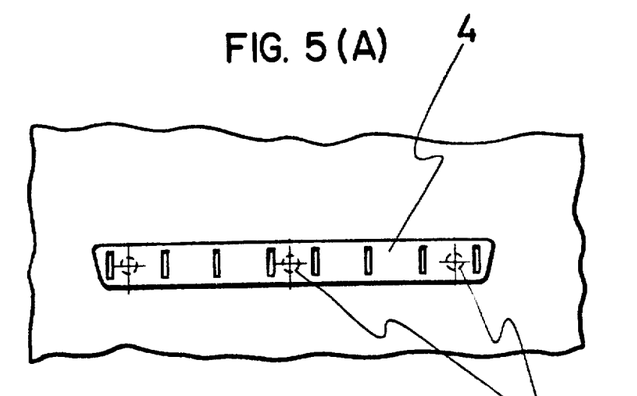
FIGS. 5A—5D are respectively a bottom view, a side view partially in cross-section, a cross-section taken alone line VC—VC of FIG. 5B, and a top view of a modification of the fabric fastener combination of FIGS. 4A—4C.
Figure 5B:
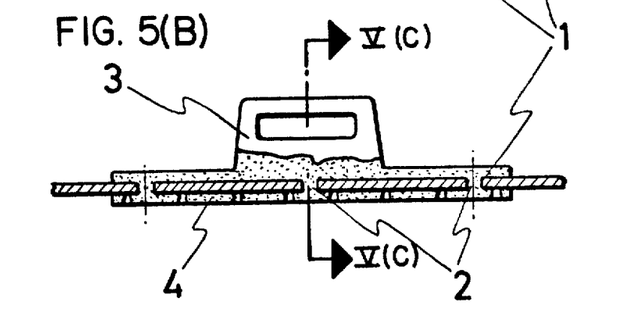
Figure 5C:
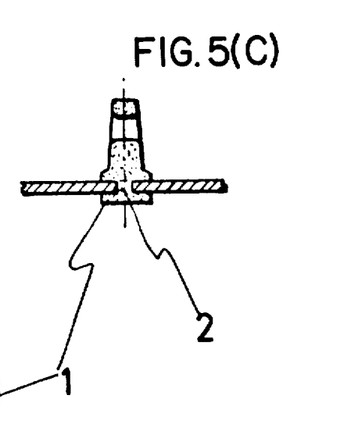
Figure 5D:
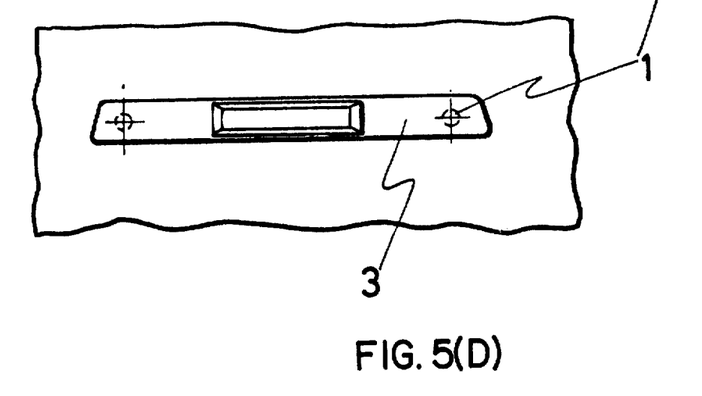

FIGS. 3A—3B illustrate a grommet attached to a piece of fabric in accordance with the present invention. Obviously in carrying out the production of this type of fabric fastener combination, there must be provided a through hole in the fabric. The grommet 5 is formed to have lips capable of enclosing the edges 6 of the fabric. It will be apparent from viewing FIGS. 3B—3D that the form of the grommet may take many varying shapes. In FIGS. 4A—4C there is shown a further type of fastener which may be connected to the center of the piece of fabric. In this case, it is also necessary that there be provided holes 1 through the fabric to unite the portions 3 and 4 of the fastener on opposite sides of the fabric.

The fabric fastener combination illustrated in FIGS. 5A—5D is similar to that shown in FIGS. 4A—4C, with the exception that the combination is made in a sturdier manner to provide additional strength.

It will be apparent from a review of FIGS. 1–5 that the fastener produced in accordance with the present invention may take many different and varied shapes. A necessary feature is that the fastener constitute portions on opposite sides of the piece of fabric. It will furthermore be apparent that the shape of the fabric itself may be greatly varied.

With reference now to FIGS. 6–11 of the drawings, a particular method and apparatus for producing a particular fabric fastener combination in accordance with the present invention will be described.

Figure 7A:
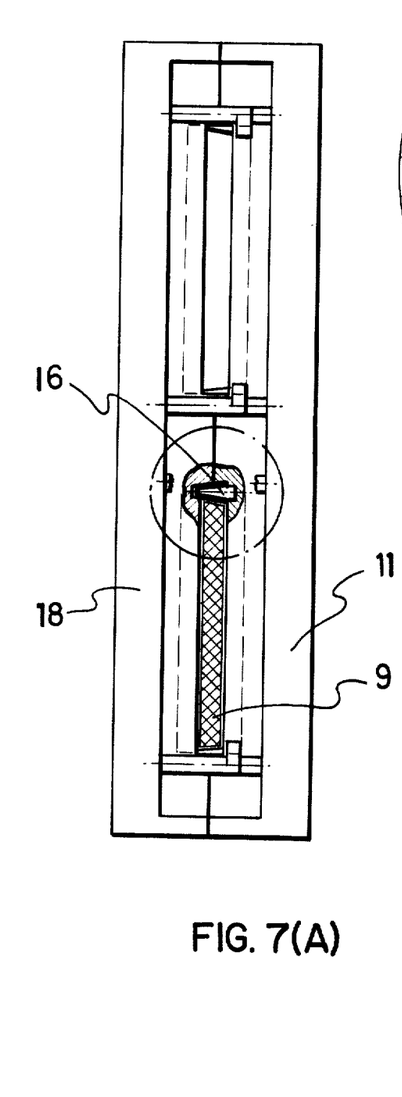
FIGS. 7A and 7B are respectively a side view of a complete mold with the fabric in place, and an enlarged view of a particular structure thereof.

In the Figures, plates 11 and 18 represent halves of a mold for the formation of a fastener on the end of a belt or strip 9 of fabric. The complete mold is formed as shown in FIG. 7A by the joining of the portions 11 and 18. The plates may desirably have conventional centering means 21 to be received in complimentary openings provided in the other mold plate.

Each of the mold plates has therein a recess such that when the mold plates are joined cavities 12 are formed. In the illustrated embodiment, the joined mold has two cavities 12 therein. Each of the cavities 12 is shaped to provide the desired configuration of the fastener to be attached to the piece of fabric. In the illustrated embodiment, the shape of the fastener is to be as illustrated and is to be attached to the end of belt 9.

Figure 6:
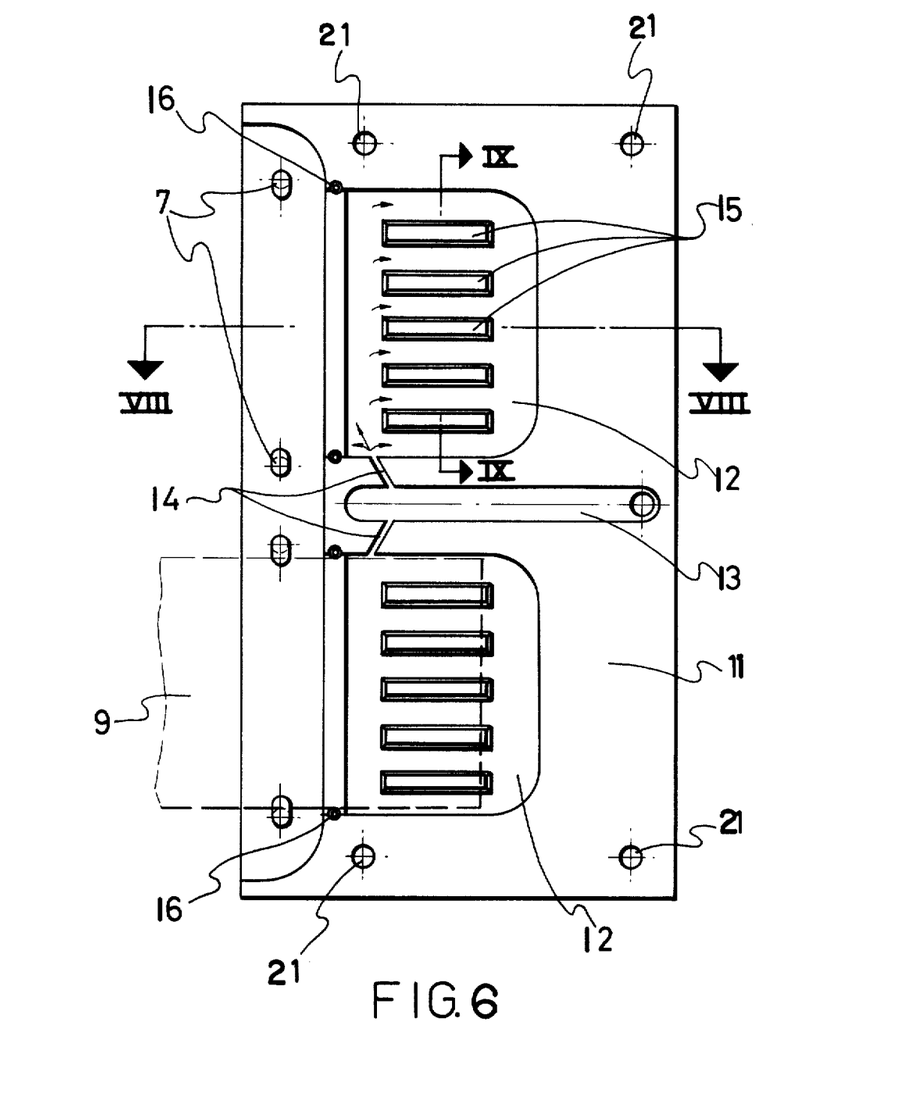
FIG. 6 shows one half of a mold employed for producing one type of fabric fastener combination in accordance with the present invention.

A single plastic inlet 13 is provided in the mold. In the illustrated embodiment, extending from inlet 13 is a single injection nozzle 14 extending into each cavity 12. There is only one nozzle 14 provided for each cavity 12. As shown in FIG. 6, nozzle 14 enters cavity 12 at an angle acute to the cavity edge through which the fabric enters the cavity. Furthermore, nozzle 14 enters cavity 12 in a plane corresponding to the position of tape 9 positioned within the mold cavity.

Figure 7B:
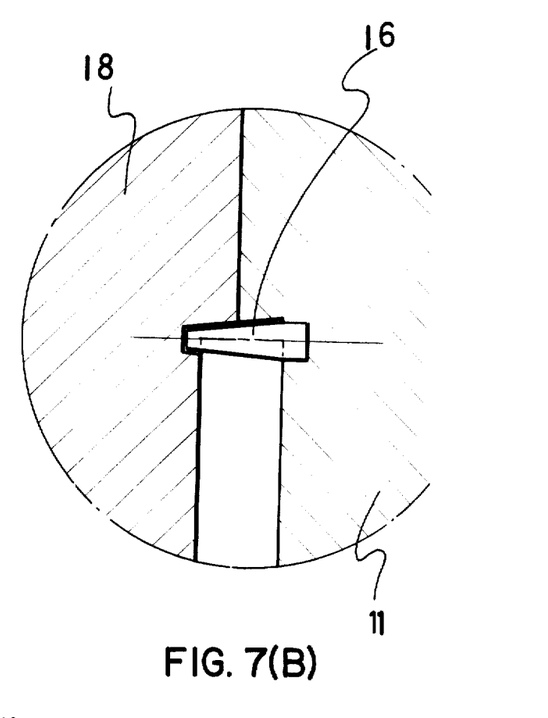
Figure 8:
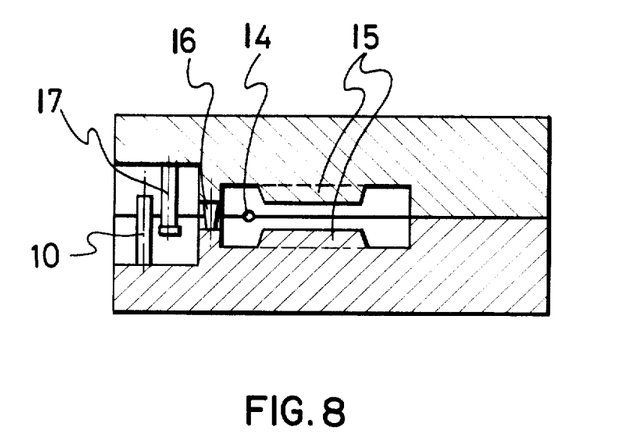
FIG. 8 is a cross-section taken along line VIII—VIII of FIG. 6.
Figure 9:
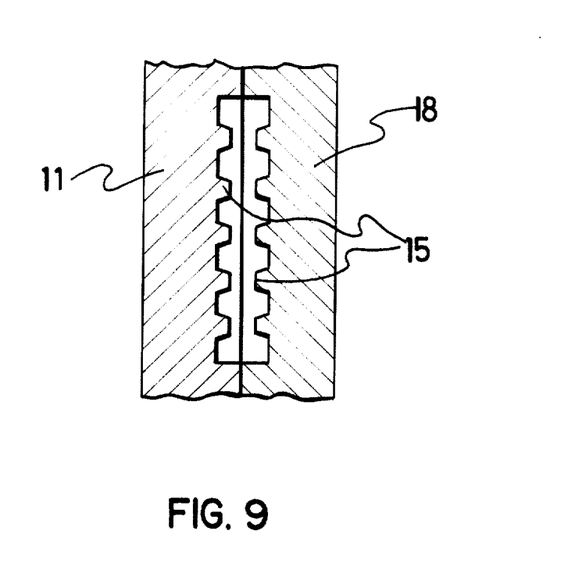
FIG. 9 is a cross-section taken along line IX—IX of FIG. 6.
Figure 10:
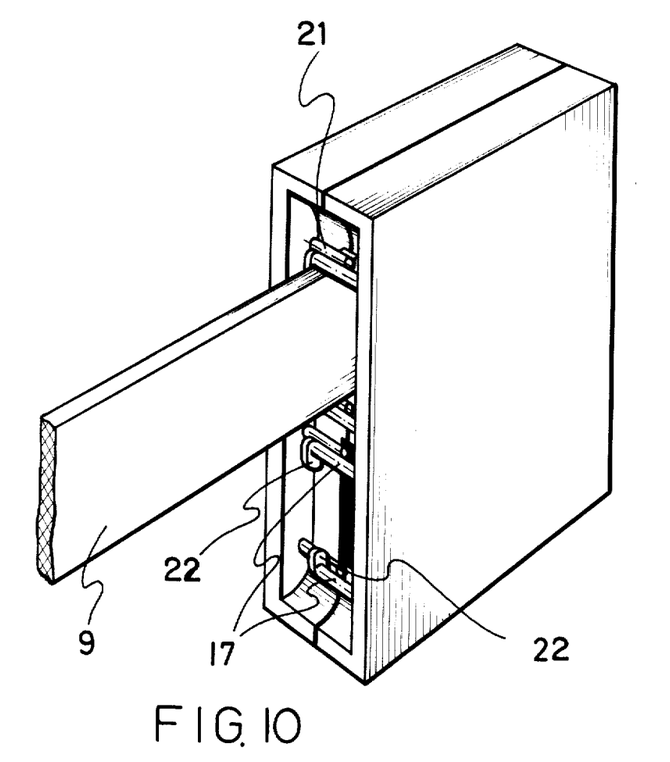
FIG. 10 is a perspective view of mold of FIG. 7A.

At the sides of each of the plates 11 and 18 there are provided a plurality of contours 15 extending into the cavity 12. In the illustrated embodiment, the contours 15 have the shape of rectangular based truncated pyramids. Each of the contours will be of an equal height. Contours 15 perform the function of maintaining tape or belt 9 spaced from the opposite walls of cavity 12. Furthermore, contours 15 prevent the end of the belt 9 from twisting. Accordingly, the injected plastic material will equally cover both sides of the end of belt 9. Furthermore, the passages existing between contours 15 will allow the flow of the injected plastic to proceed in the manner illustrated by the arrows in FIG. 6. This results in a movement of the plastic against the end of the fabric belt to produce an effect referred to as "combining." Thus, the route followed by the plastic material during injection will aid in maintaining the position of the belt 9 within the cavity, thereby avoiding the formation of creases or distortion in the fabric. As shown in the drawings, the cavities 12 are wider than the belt 9. Therefore, the fastener is formed to cover the edges of the belt 9. However, in doing so it is necessary to ensure centering of the belt 9 within the cavity 12. For this purpose, pivots 16 are provided. These pivots, in addition to centering the tape within the cavity 12, also perform a sealing effect to prevent leaking of any plastic material from the mold cavity 12. Perferably, and as shown in FIGS. 7A and 7B, the pivots 16 are in the shape of truncated rods whereby the sealing effect may always be adjusted. This is particularly important in instances where the width of the belt is never exact. The tapered sides of pivots 16 ensure the contact thereof with the belt 9, thereby ensuring sealing of the cavity and centering of the belt. For instance, the width of the belts 9 may easily have a variation of plus or minus 2 millimeters. Due to the tapered edges of pivots 16, this size variation may be compensated.

Figure 11:
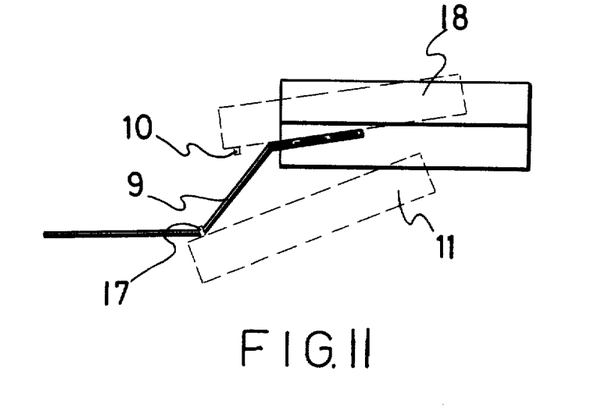
FIG. 11 is a schematic illustration of the manner of stripping the mold of FIG. 10.

When the injection process takes place with the mold in a horizontal plane, pivots 16 act as guides for the belt 9. However, if the injection operation takes place with the mold in a vertical position, it is generally necessary to provide other complimentary guide means to aid in separation of the mold plates 11 and 18. This is particularly true when the separation of the mold plates takes place in a diverging manner, for instance as shown in FIG. 11. For this purpose, there are provided pivots 17 having at their free ends elbows 22.

Also provided are cylindrical pivots 10. The belt 9 will be retained between these pivots in such a way that during separation of the mold plates and stripping thereof, the elbows 22 will grasp the belt 9 toward one of the mold plates as shown in FIG. 6. The provision of pivots 17 and 10 is particularly necessary when carrying out molding operations contemplating the incorporation of angles or other complex shapes in the fasteners.

Although FIGS. 6–11 illustrate a particular structure for carrying out an operation for producing a particular fabric fastener combination, it will be apparent to those skilled in the art that the present invention encompasses the use of other such molding structure, modified as necessary to produce the various fabric fastener combinations illustrated in FIGS. 1–5, as well as other such combinations.

Other changes and modifications in the specific structure and process of the present invention, all such modifications intended to be encompassed within the scope of the present invention, will be apparent to those skilled in the art.

I claim:

1. An apparatus for molding a fastener onto a piece of fabric, said apparatus comprising:
   a mold adapted to surround that portion of a piece of fabric to which the fastener is to be attached;
   said mold having therein a cavity of a shape to form the desired fastener, said portion of said piece of fabric extending into said cavity along an edge thereof;
   means within said cavity for centering said portion of fabric between opposite walls of said mold;
   means for guiding the position of the edges of said piece of fabric, said means for guiding comprising a plurality of truncated pivots situated to contact and guide said edges of said piece of fabric; and
   a single injection opening entering into said cavity for injecting molten material therein for forming said fastener, said single injection opening entering into said cavity at an acute angle to said edge thereof and in a plane corresponding to the plane of said portion of said piece of fabric when positioned in said cavity.

2. An apparatus for molding a fastener onto a piece of fabric, said apparatus comprising:
   a mold adapted to surround that portion of a piece of fabric to which the fastener is to be attached;
   said mold having therein a cavity of a shape to form the desired fastener, said portion of said piece of fabric extending into said cavity along an edge thereof;
   means within said cavity for centering said portion of fabric between opposite walls of said mold;
   means for guiding the position of the edges of said piece of fabric;
   a single injection opening entering into said cavity for injecting molten material therein for forming said fastener, said single injection opening entering into said cavity at an acute angle to said edge thereof and in a plane corresponding to the plane of said portion of said piece of fabric when positioned in said cavity; and
   elbow-shaped pivot means without said cavity for grasping said piece of fabric during stripping thereof from said mold.

* * * * *